Patented Aug. 19, 1952

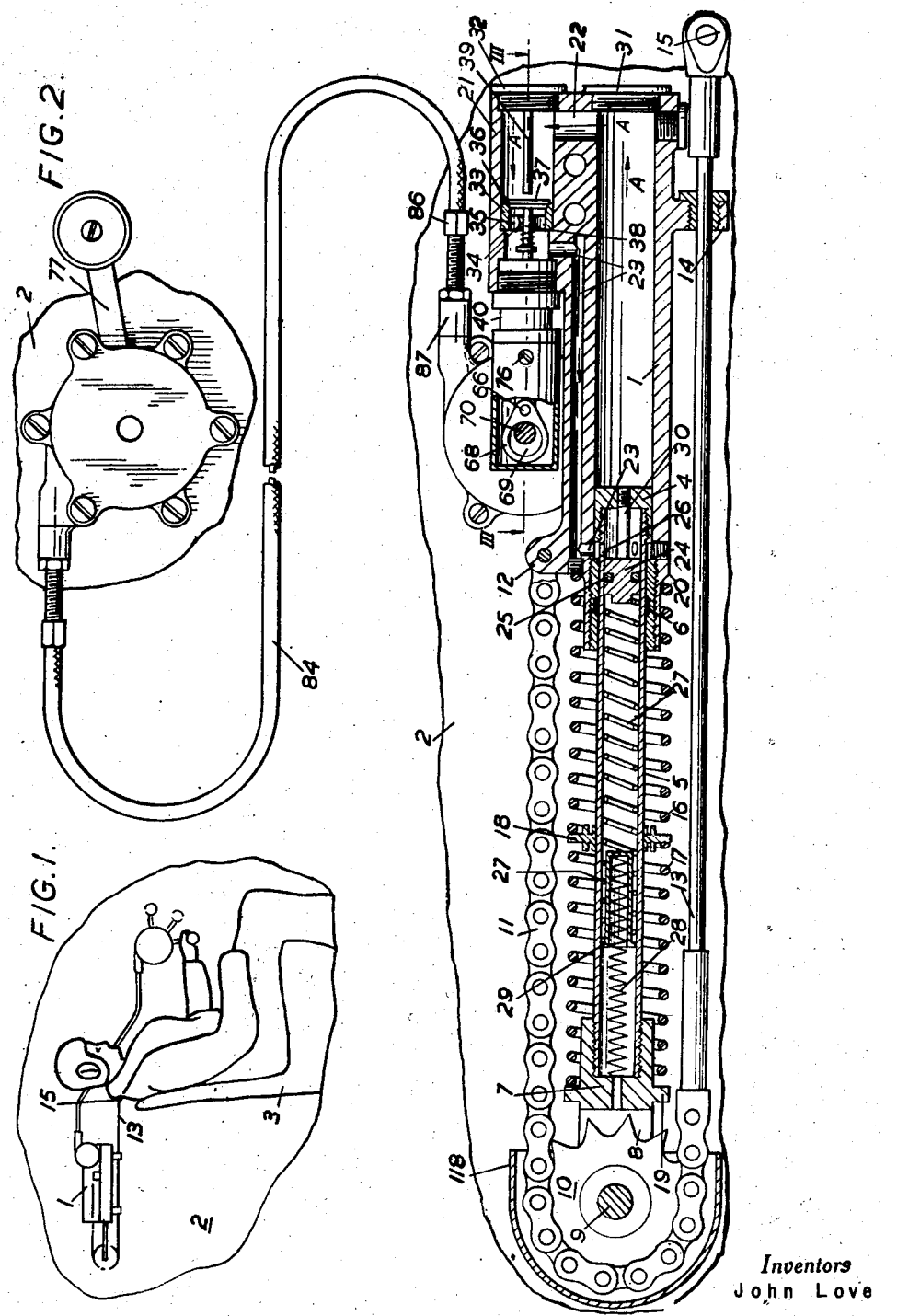

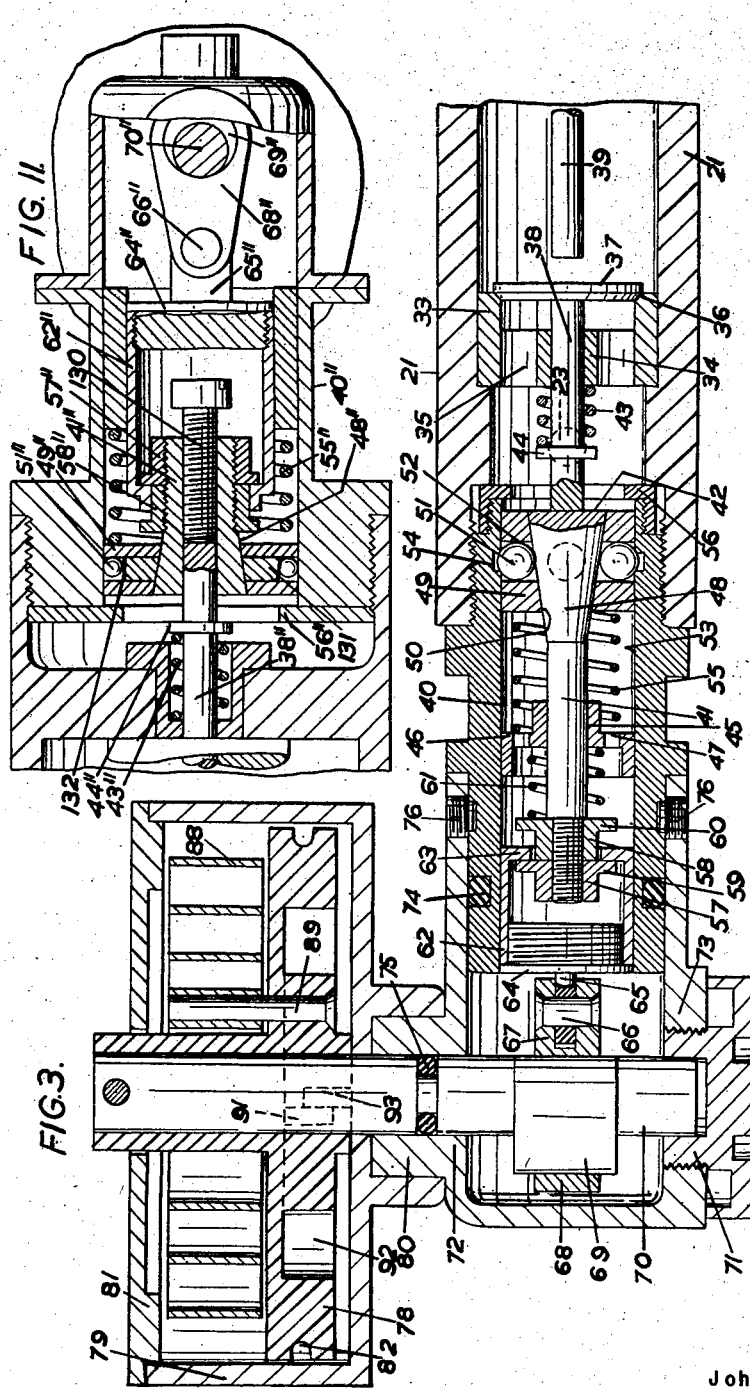

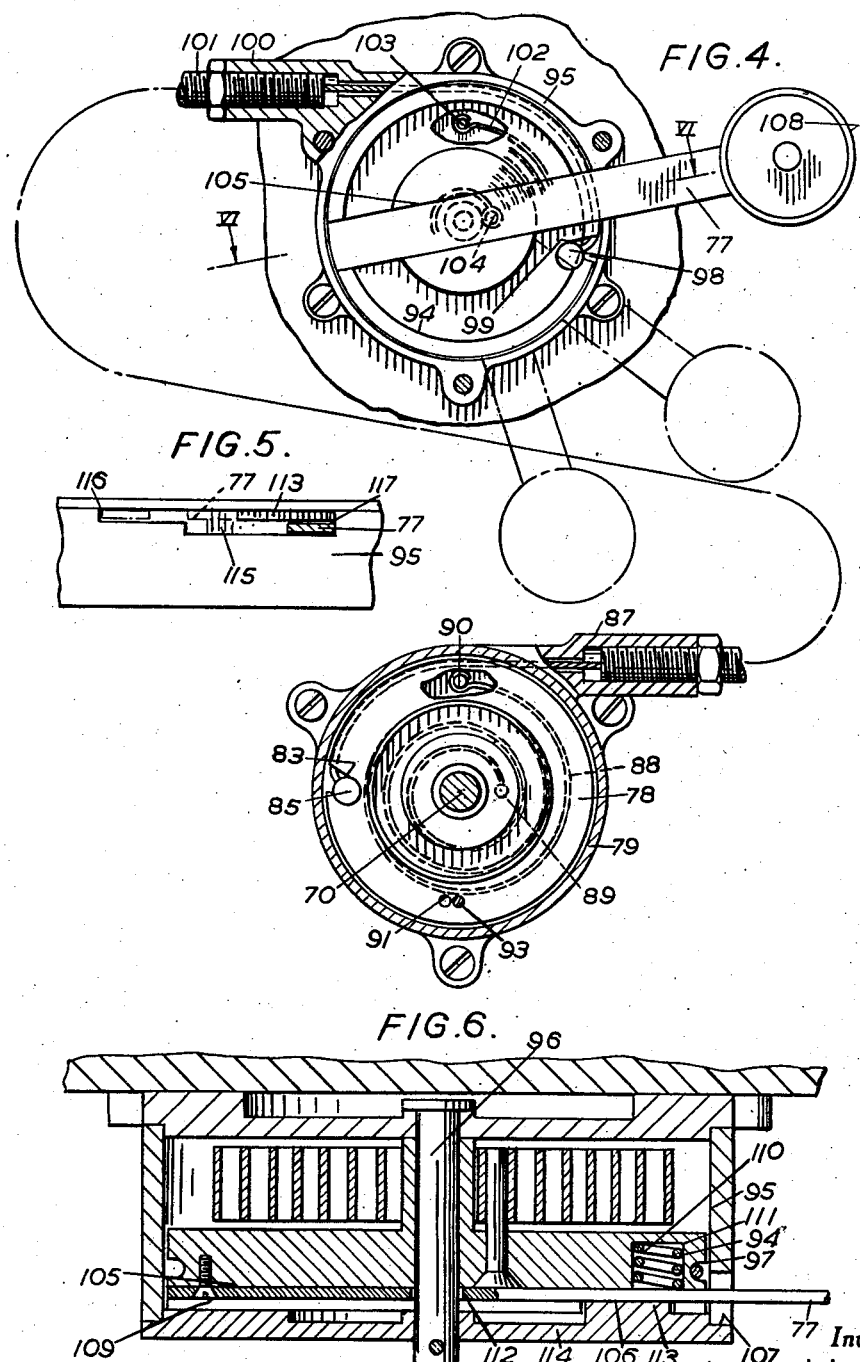

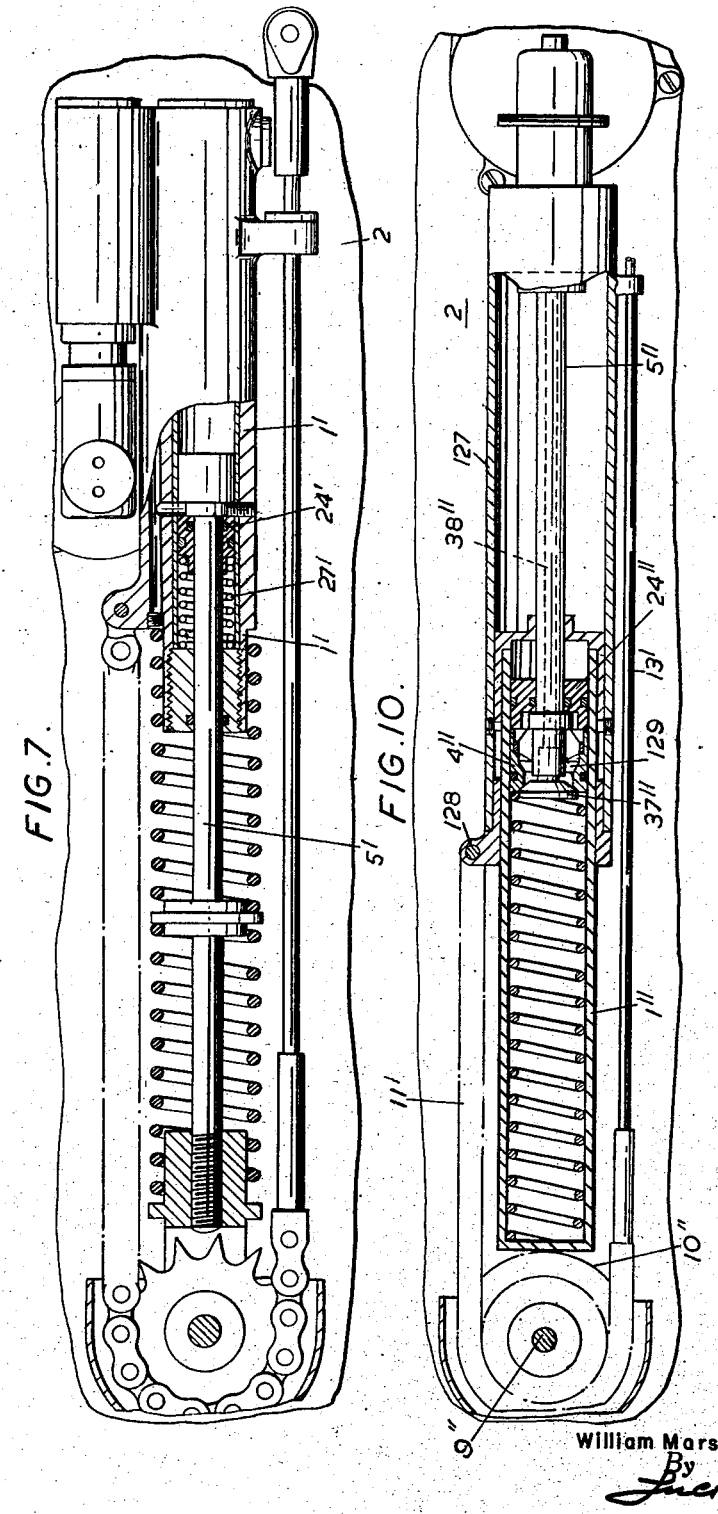

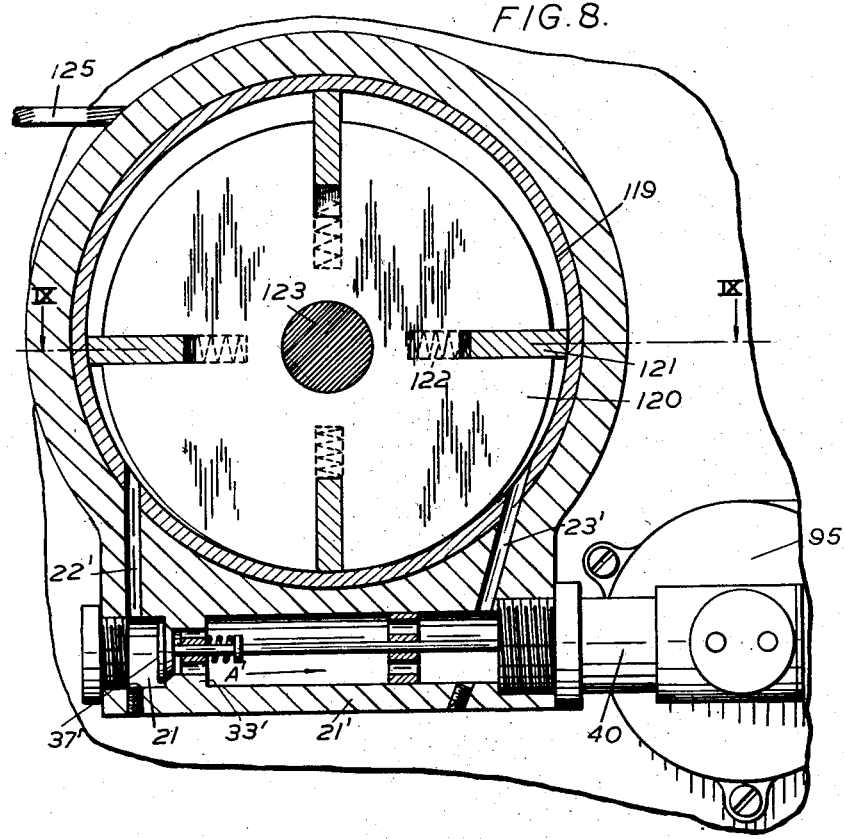
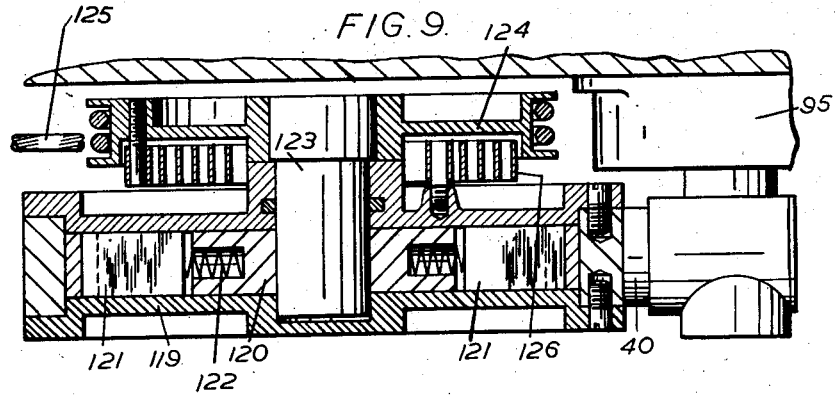

2,607,581

UNITED STATES PATENT OFFICE 2,607,581

HYDRAULIC APPARATUS FOR CONTROLLING RELATIVE MOVEMENT BETWEEN ASSOCIATED BODIES

John Love and William M. Sutherland, Glasgow, Scotland, assignors to K. A. C. Limited, Glasgow, Scotland, a British company Application October 6, 1949, Serial No. 119,972
In Great Britain October 8, 1948

23 Claims. (Cl. 267—1)

This invention concerns a new or improved hydraulic apparatus for preventing, checking or controlling relative movement between associated bodies arising from changes in the velocity of at least one of such bodies, and the inertia of these bodies. Thus apparatus according to the invention is particularly suitable for controlling the relative movement in a predetermined direction between a pair of bodies which normally move in unison.

An important object of this invention is to provide hydraulic apparatus for use in aircraft and which, by acting through the medium of the safety harness of an airman in such aircraft, will control the movement of the airman in a predetermined direction with respect to the aircraft in the event of excessive changes occurring in the velocity of the aircraft.

A further object of the invention is to arrange the said hydraulic apparatus so that it will check or prevent the relative movement of the airman with respect to the aircraft in the said predetermined direction so long as excessive forces persist, whilst a still further object of the invention is so to construct the said hydraulic apparatus that, although the airman's movement in the said predetermined direction will be controlled he will be quite free, in normal circumstances, to move in the controlled direction, the opposite direction, and also in any other direction.

A further object of the invention is to provide means whereby the said hydraulic apparatus may be rendered inoperative at will.

Another object of the invention is to provide means whereby the said hydraulic apparatus may be manually caused to lock the airman in any desired position against movement in the said predetermined direction.

Thus, although the invention may be applied to other uses it is particularly intended for use in aircraft and, although when used in aircraft it will normally be used for controlling the forward movement of a pilot (which expression should be regarded as covering a forwardly seated passenger), it could also be used for controlling the movement of, for example, a rear gunner facing rearwardly and who is liable to be flung rearwardly with respect to the aircraft during take-off or other conditions involving rapid acceleration of the aircraft. The invention will, however, hereinafter be described principally in connection with its use for controlling the relative forward velocity of a pilot with respect to his seat in an aircraft, the apparatus being used in this connection as a protective means for the pilot who requires freedom of forward and rearward movement in his seat in normal flying conditions but needs to be safeguarded against injury by being flung forwardly with respect to his seat in the event of excessive forward forces acting upon him due to marked deceleration of the aircraft as a result, for example, of the sudden arrest of the aircraft's motion as when landing on the deck of an aircraft carrier where arresters or the like are employed, or as a result of flying through regions of marked atmospheric turbulence.

According to this invention there is provided hydraulic apparatus for controlling the relative velocity in a predetermined direction between two bodies which normally move together in unison, such apparatus comprising liquid transferring means adapted to be attached to one of said bodies; coupling means for connecting the said liquid transferring means to the other of said bodies to cause the operation of said liquid transferring means as a result of relative movement occurring in the said predetermined direction between said bodies; a conduit connected to said liquid transferring means and constituting a flow-path through which liquid is forced upon operation of said liquid transferring means; a check valve located in said conduit; control spring means co-operating with said check valve normally to maintain the latter open, thereby to permit liquid to flow through said conduit in either direction; said check valve at least partially closing against the action of said control spring means in response to the pressure of liquid forced through said conduit by the said liquid transferring means to check the said flow of liquid when such flow exceeds a predetermined velocity, thereby to check the relative movement in said predetermined direction between said bodies; and catch means co-operating with said control spring means to prevent the continued co-operation of said control spring means with said check valve subsequent to a liquid-flow-checking operation of the latter.

The said liquid transferring means may comprise a cylinder sealed at both ends and adapted to be attached to one of said bodies, a piston reciprocable in said cylinder being connected to the other of said bodies so that upon relative movement occurring in said predetermined direction between said bodies the piston is moved axially within the cylinder to force liquid through the said conduit which connects parts of the cylinder on opposite sides of said piston; alternatively the liquid transferring means may comprise a rotary-vane type pump adapted to be attached to one of said bodies, the rotor of such pump being connected to the other of said bodies so that upon relative movement occurring between said bodies in said predetermined direction, such rotor is rotated to force liquid through said conduit which constitutes a by-pass between the outlet and inlet sides of said pump.

Preferably the apparatus of this invention includes catch-releasing means co-operating with said catch means for manually releasing said control spring means from the influence of said catch means; furthermore, said catch-releasing means are advantageously adjustable to prevent, when so desired, said check valve from closing, irrespective of the pressure of liquid acting thereon.

Although usually one hydraulic control apparatus as above described involving the use of only a single pump and single check valve control mechanism will be necessary it may, in come cases, be desirable to duplicate the apparatus for each airman as, for example, in the case where it is desired to make the hydraulic apparatus small or where other apparatus or impedimenta in the aircraft renders a single centrally placed gear constructed in accordance with this invention inconvenient.

Hereinafter the invention will be described with particular reference to its application to the control of the forward movement of the pilot of an aircraft with respect to his seat in such aircraft but it should be understood that the invention is not restricted in its use to this particular purpose although it is, in this connection that the invention is likely to find its most extensive application. Thus, although in the following description and in other parts of the specification the words "pilot" and "aircraft" are extensively used, it should be understood that they are only named as examples of two "bodies" whose relative velocity is to be controlled.

In order that the invention may be more readily understood and the manner of carrying the same into practice thoroughly appreciated, certain embodiments of the invention will now be described, by way of example, and with reference to the accompanying drawings, as applied to a hydraulic control device for use in conjunction with the pilot's safety harness of an aeroplane or similar aircraft, the apparatus described being intended to control the forward movement of the pilot in relation to his seat particularly in cases of emergency.

In the drawings:

Figure 1 is a diagrammatical view illustrating one possible arrangement of the hydraulic apparatus according to this invention in relation to the pilot and his seat in an aircraft;

Figure 2 is a longitudinal part sectional elevation of one form of the hydraulic control apparatus constructed in accordance with this invention;

Figure 3 is a section on line III—III, Figure 2, drawn to an enlarged scale;

Figure 4 is a part sectional and part fragmentary side elevation of the control means of the apparatus shown in Figure 2, this portion of the apparatus being drawn to a larger scale than Figure 2;

Figure 5 is a plan view showing a detail of the mechanism illustrated in the upper part of Figure 4;

Figure 6 is a section on line VI—VI, Figure 4, drawn to an enlarged scale;

Figure 7 is a part side and part sectional elevation of a modified form of the apparatus shown in Figure 2;

Figure 8 is a part side and part sectional elevation of a still further modified form of the apparatus shown in Figure 2;

Figure 9 is a section along the line IX—IX of the apparatus shown in Figure 8;

Figure 10 is a part side elevation and part vertical sectional elevation of a portion of a still further modified form of the apparatus according to this invention; and Figure 11 is an enlarged vertical section of a portion of the apparatus shown in Figure 10.

In the embodiment of the invention shown in Figures 2 to 6 the apparatus comprises liquid transferring or liquid pumping means including a cylinder 1 adapted to be rigidly secured to the structure of an aeroplane or to a fixed part thereof such as a seat. In Figure 1 the cylinder 1 is shown as being secured to the side of the fuselage 2 of the aircraft in a horizontal position behind the pilot's seat 3.

Within the cylinder 1 is reciprocably mounted a pumping element or piston 4 (hereinafter referred to as the "main piston"), this piston being screwed on to one end of a straight tubular piston rod 5 which passes through a liquid-tight gland 6 at the rear end (the left hand end in Figure 2) of the cylinder 1.

The end of the piston rod 5 remote from that carrying piston 4 carries a cap 7 screwed thereon and having a bifurcated rear end 8 carrying a horizontal spindle 9 upon which is mounted a sprocket wheel 10 which is thus free to rotate about an axis perpendicular to the axis of the cylinder 1.

A protective cover 118 is preferably provided around the sprocket 10 and the chain passing thereover, this cover being suitably supported upon the spindle 9 and the cap 7.

Over the sprocket 10 passes a chain 11 having one end attached to a lug 12 at the rear end of the cylinder 1 and the other end attached to a coupling rod 13 mounted for guided axial movement in a lug 14 on the cylinder 1 and adapted at its front end to be coupled through the medium of an eye 15 to the safety harness of the pilot as diagrammatically illustrated in Figure 1.

If desired the chain 11 could be replaced by a cable, ribbon or other suitable flexible member, in which case the sprocket wheel 10 would be replaced by a pulley or drum.

Alternatively the sprocket 10 could if desired be omitted and the chain 11 or other appropriate flexible member could then be attached directly to the cap 7 of the piston rod 5 so that tension applied to the flexible member will cause the piston 4 to move forwardly into the cylinder 1, but in this case the cylinder 1 would have to be twice as long as in the example illustrated where the stroke of the piston 4 is of a length equal to only half of the total distance movable by the eye 15 between its two extreme end positions.

Forward movement of the pilot relatively to his seat effects the forward movement of the piston 4 into the cylinder 1 by a distance equal to half that moved by the pilot and the return of the piston towards the rear end of the cylinder 1 is effected by spring means. In the embodiment of the invention shown in Figures 2 to 6 this spring means comprises a pair of helical springs 16 and 17 mounted around the piston rod 5 respectively on opposite sides of a thrust collar 18 axially slidable upon the piston rod 5 intermediate its ends, each of the springs 16 and 17 bearing at one end upon the collar 18 and bearing at their other ends respectively upon a collar 19 on the sealing cap 7 of the piston rod and upon an annular shoulder 20 of the cylinder 1. The use of two springs 16 and 17 in this way provides more stable operation than would be possible with a single spring of the same rate and length as the described combination.

The springs 16 and 17 besides returning the piston 4 to its rearward position assist in returning the pilot to his normal rearward position in his seat and, to some extent, serve to relieve him of the weight of his harness without interfering with his adequately free forward movement in ordinary circumstances.

Upon one side of the cylinder 1 is integrally formed or attached a valve chamber 21, the opposite ends of which communicate by means of by-pass passages 22 and 23 with the opposite sides of the pump formed by the cylinder 1 and piston 4, the by-pass passages respectively leading to the interior of the cylinder 1 near the opposite ends thereof and the ends of the said cylinder, the passages 22 and 23, together with the chamber 21, forming a conduit constituting a predetermined flow path or hydraulic circuit through which liquid filling these passages, the chamber 21 and the cylinder 1 is adapted to be propelled by the piston 4. Thus the said conduit constitutes the entire flow path through which liquid is forced upon reciprocation of the piston 4 in the cylinder 1.

Since the volume of liquid displaced by the piston 4 on moving forwards is greater than the volume made available behind the piston owing to the volume displaced by the said piston rod 5, radial ports 26 are provided through the wall of the rod 5 behind the piston 4 and through which the excess liquid can pass into the space within the rod 5.

Within the tubular piston rod 5 is reciprocably mounted a compensating piston 24 which is urged forwardly in the piston rod by spring means subsequently to be described. The piston 24 is preferably provided with one or more peripheral sealing rings 25 which may conveniently be or each be of the well known toroidal or O-ring type.

In the embodiment illustrated, the compensating piston 24 is urged forwardly by a pair of coaxial overlapping springs respectively marked 27 and 28, the spring 27 being of larger diameter than the spring 28 and fitting at its rear end over a deep cup-shaped thrust member 29 coaxial with and slidable axially within the piston rod 5. Similarly the front end of the spring 28 is received within the thrust member 29 and abuts at one end against the closed end of this member and at the other end against the sealing cap 7. The end of the spring 27 which fits over the thrust member 29 abuts an external collar at the open end of the thrust member, and at the other end engages with the rear surface of the compensating piston 24.

Thus the two springs overlap one another by a distance approximately corresponding to the depth of the cup-shaped thrust member 29 and by the arrangement described a spring combination of lower rate is possible than by the use of a single spring.

It will be apparent that as the space within the piston rod 5 between the main piston 4 and the compensating piston 24 is filled with liquid and is in communication with the cylinder 1, the compensating piston 24 will be driven backwardly compressing the springs 27 and 28 when the main piston 4 moves forwardly in the cylinder 1, the compensating piston moving backwardly through a greater distance than the main piston 4 moves forwardly in the cylinder 1 owing to the difference in diameter between the outer and inner surfaces of the piston rod 5.

To limit the forward movement of the compensating piston 24 in the piston rod 5 and thus prevent the compensating piston closing the ports 26, an axial stop pin 30 is fixed in the head of the main piston 4 and projects rearwardly therefrom.

When the pilot moves forwardly with respect to his seat 3, the piston 4 is driven forwardly in the cylinder 1 which produces a forced flow of the liquid in the system in the direction of the arrows A (Figure 2) from the front of the cylinder 1 through the by-pass 22 into the chamber 21 and from the latter through the by-pass 23 to the rear end of the cylinder 1, whilst when the piston 4 recedes towards its rearward normal position under the influence of the return springs 16 and 17, a corresponding flow of liquid will take place from the rear part of the cylinder, through the by-pass passages 23 and 22 and the chamber 21 to the front part of the cylinder. It will be appreciated that the rate of flow of liquid through the said by-passes and chamber 21 in the direction of arrows A will depend upon the rate of the pilot's forward movement with respect to his seat 3, there being an accelerated liquid flow on any accelerated forward movement of the pilot occurring.

The front end of the cylinder 1 is closed preferably by a screw-in plug 31 and the front end of the valve chamber 21 may similarly be closed by a screw-in plug 32.

Between the ends of the chamber 21, which is preferably internally cylindrical, there is provided a fixed transverse partition or spider 33 which has a central boss 34 surrounded by a series of ports or orifices 35 permitting fluid to flow from one side of the partition or spider to the other side thereof. The front end of the partition 33 is provided with an annular seat 36 upon which is adapted to seat in certain circumstances a check valve 37 of the poppet or mushroom type, the stem 38 of which is coaxially arranged with respect to the internal bore of the chamber 21 and is axially slidable in a guide formed in the central boss 34 of the partition 33.

The forward movement of the valve 37 is limited by means of an axial stop pin 39 carried by the plug 32 in the front end of the valve chamber 21, and the rear end of the stem 38 of the valve is adapted to co-operate with certain control mechanism to be described subsequently and which is contained in a guide sleeve 40 coaxially screwed into the rear end of the valve chamber 21 as is clearly shown in Figure 3 of the drawings.

The stem 38 of the check valve 37 normally bears upon the front end 42 of a control plunger or push rod 41, the latter being axially slidable in a guide formed in the central boss 45 of a partition 46 mounted transversely in the guide sleeve 40, the said push-rod being coaxial with the valve stem 38 which is preferably lightly urged against the front end 42 of the push rod 41 by means of a spring 43 arranged around the valve stem 38 and abutting at one end the rear face of the boss 34 of the partition 33 and at the other end abutting against a collar 44 on the valve stem. The web of the partition 46 is furnished with a ring of ports 47 to permit the flow of liquid through the partition.

At its front end the push rod 41 is furnished with a frusto-conical portion or head 48 around which is arranged a collar 49 (hereinafter referred to as the "plunger collar"), having a corresponding internal conical surface 50. The collar 49 is axially slidable in the bore of the guide sleeve 40, but the forward movement of the collar 49 is limited by an annular stop 56 at the front end of the guide sleeve 40.

The plunger collar 49 carries a plurality, e. g. four locking balls 51 which are mounted in radial bores 52 in the collar, these radial bores being equiangularly spaced around the collar and the balls 51 being of such a size that they normally bear upon the frusto-conical surface of the head 48 of the plunger 41, and also upon the inner surface 53 of the guide sleeve 40.

The guide sleeve 40 is provided with an annular groove 54 with which the said locking balls 51 may, in a predetermined position of the plunger collar 49 with respect to the sleeve 40, co-operate in order to lock the plunger collar against axial movement in the sleeve 40.

Arranged coaxially around the push rod 41, is a control spring 55, abutting against the partition 46 and against the rear face of the plunger collar 49. The spring 55 thus urges the collar 49 in a forwards direction, and the collar 49 co-operating with the frusto-conical head 48 of the push-rod 41, urges the latter forwards thereby resiliently urging the valve 37 in the direction in which the latter opens.

It will be seen that in flowing through the chamber 21 from the front end to the rear end thereof by way of the ports or orifices 35 in the partition 33, the liquid will pass over the head of the valve 37, and, as is well known, the hydraulic pressure acting upon the front side of the head of the valve 37 will increase as the rate of flow of the liquid in this direction increases, i. e. the force tending to close the valve by moving it rearwardly on to its seat 36 increases as the rate of flow of the liquid from the front of the chamber 21 to the rear thereof increases. If the rate of flow of the liquid in the said direction increases beyond a predetermined value, the valve 37 will move towards its seat 36, restricting the flow of liquid through the partition 33 and ultimately preventing this flow altogether.

The valve 37 is thus responsive to the hydraulic pressure arising as a result of the forced flow of liquid through the said predetermined path and serves as an automatic means for restricting or preventing the flow of liquid through the chamber 21, and consequently automatically restricts or prevents the forward movement of the pilot with respect to his seat since this movement can only take place when the main piston 4 is free to move forwardly in the cylinder 1, the pilot being connected to the piston 4 as has been described. Since the forwards velocity of the piston 4 in the cylinder 1 is controlled by the rate of flow of the liquid from the front part of the cylinder through the chamber 21 and the by-passes 22 and 23 in the direction of the arrows A, if this flow is restricted or prevented, then the forwards movement of the piston 4 in the cylinder 1, and hence the forwards movement of the pilot with respect to his seat will be similarly restricted or prevented.

The rear end of the push rod 41 is screw threaded and carries a pair of flanged nuts 57 and 58 coaxially arranged with their flanges 59 and 60 axially spaced. The extremity of the screw threaded portion of the push rod 41 may be riveted over to lock the nuts 57 and 58 upon the plunger.

A helical retaining spring 61 is mounted around the push rod 41 between the partition 46 and the flange 60 of the nut 58, the opposite ends of the spring 61 bearing upon the said parts and the spring serving to maintain the frusto-conical surface of the head 48 of the push rod in engagement with the corresponding surface 50 of the plunger collar 49 when this collar is locked in the guide sleeve 40 (as shown in Figure 3) since in this locked position the spring 55 is ineffective to maintain the collar 49 and head 48 in close contact. Thus the spring 61 ensures that the balls 51 are maintained in the groove 54 once the collar 49 has reached its locked position.

The nuts 57 and 58 on the push rod 41 attach the push rod 41 to the front end of a hollow control piston 62 axially slidable, and a close fit, in the guide sleeve 40, the piston having at its front end, an inturned flange 63 engaged between the flanges 59 and 60 of the nuts 57 and 58, these flanges being axially spaced to permit a small degree of axial relative movement between the piston and the push rod for the purposes hereinafter referred to in describing the operation of the apparatus.

Into the rear end of the piston 62 is screwed a plug 64 having a central lug 65 connected by a transverse pivot pin 66 to a bifurcated lug or link 67 of an eccentric strap 68 surrounding an eccentric 69 fixed upon a control shaft 70 which is arranged with its axis at right angles to, and intersecting, the axis of the control piston 62, push rod 41 and check valve 37.

The control shaft 70 is supported in bearings 71 and 72 carried or formed in the opposite sides of a cover cap 73 mounted over the rear end of the guide sleeve 40 and serving to seal the rear end of the latter against the escape of liquid therefrom, toroidal or O-rings 74 and 75 or other suitable seals being provided respectively between the cover 73 and the guide sleeve 40 and between the control shaft 70 and its bearing 72 in order to prevent the escape of liquid at these parts. The cover cap 73 is conveniently secured upon the guide sleeve 40 by screws 76.

Rotation of the control shaft 70, which is preferably effected by means hereinafter described, produces axial movement of the control piston 62 and corresponding axial movement of the push rod 41, the plunger collar 49 and the check valve 37.

When the eccentric 69 is turned so that the control piston 62 is moved rearwardly to the fully withdrawn position (as shown in Figure 3) the push rod 41 is also withdrawn and pulls the plunger collar 49 and the balls 51 rearwardly with it against the action of the control spring 55 until the balls 51 register with the groove 54 in the guide sleeve 40, further rearward movement of the push rod 41 forcing the balls 51 outwardly into the groove 54 thus locking the plunger collar 49 against axial movement.

The said rearward withdrawal of the push rod 41 releases the check valve 37 from the action of the control spring 55 so that this valve is closed by the spring 43 around its stem. When the valve 37 is thus closed the flow of liquid in the direction of the arrows A in Figure 2 is prevented, and consequently the pilot is prevented from moving forward relatively to his seat. Nevertheless, the pilot is able to move rearwardly should he be in a forwardly disposed position at the time of the closing of the valve 37, because the spring 43 is insufficiently powerful to hold the valve 37 closed against the hydraulic pressure operating on its rear face when the return springs 16 and 17 tend to withdraw the piston 4 rearwardly in the cylinder 1, as hereinbefore described.

The spring 43 on the stem of the valve 37 is preferably provided but it may be omitted if desired, in which case the valve 37 will be closed immediately the piston 4 moves forwardly in the cylinder 1 and the slightest excess pressure is built up on the front of the valve 37.

The aforementioned setting of the eccentric 69, the control piston 62, push rod 41 and valve 37, and parts connected therewith will hereinafter be referred to as the "Manually Locked" setting, the apparatus being set in this condition when a pilot wishes to adjust his safety harness (e. g. on first entering an aircraft) and at any time when the pilot desires to be held rigidly in his seat, such as for example during manoevres involving inverted flight.

Rotation of the control shaft 70 and eccentric 69 from the position shown in Figure 3 will cause the control piston 62 to move forwardly so that after the piston 62 has moved a distance corresponding to the axial distance between the flange 63 of the piston 62 and the flange 60 of the nut 58, the push rod 41 will be driven forwardly through the locked plunger collar 49 thereby releasing the locking balls 51 from the groove 54 in the guide sleeve 40 and permitting the plunger collar to move forwardly with the push rod under the action of the control spring 55. As it moves forwardly, the push rod 41 will engage the stem 38 of the check valve 37 and transmit thereto the thrust of the control spring 55 so that the check valve 37 will be moved to its opened position and maintained in this position. This operation of the control shaft 70 and eccentric 69, and the condition of the mechanism when this operation has taken place, will be referred to respectively hereafter as the "Forced Unlocking" and the "Forced Unlocked" setting of the mechanism.

When the control shaft 70 is rotated to a position intermediate between the "Manually Locked" and the "Forced Unlocked" settings described above, the control piston 62 will be held in a position intermediate between its extreme positions. This intermediate setting of the control shaft 70 will be made subsequent to "Forced Unlocking" of the mechanism, the control spring 55 urging the plunger collar 49 and hence the push rod 41 forwards, the latter bearing on the stem 38 of the valve 37 and holding the valve open.

The intermediate setting of the control shaft 70 and the corresponding positions of the parts of the apparatus will hereinafter be referred to as the "Auto Lock" position and in this position of the apparatus liquid may flow freely past the check valve 37 in either direction so as to permit the pilot free movement forwardly or rearwardly with respect to his seat 3 so long as his forward relative velocity with respect to the seat is normal, i. e. does not exceed the said predetermined value.

In this "Auto Lock" setting of the mechanism, the flange 59 of nut 57 will engage the rear of the flange 63 of the control piston 62, but, should the hydraulic pressure upon the front of the head of the valve 37 increase beyond the said predetermined value (owing to an increase in the relative velocity between the pilot and his seat) the valve 37 will be driven rearwardly against the influence of the control spring 55, similar rearwards movement of the push rod 41 being permitted by the axial clearance between the flange 60 of the nut 58 and the front of the flange 63 of the control piston 62, this clearance being sufficient to allow the valve to close and the locking balls 51 to engage the groove 54 in the guide sleeve 40, to lock the plunger collar against axial movement. The mechanism will remain in this locked condition, and the apparatus will operate just as described for the "Manually Locked" setting, until such time as the pilot selects the "Forced Unlocked" setting of the control shaft.

Conveniently the apparatus will be designed and set to operate to check the forward movement of the pilot if and when his forward relative velocity with respect to his seat exceeds about two feet per second, but it should be understood that the apparatus may be designed and set to operate at any other suitable velocity.

In the "Auto Lock" setting of the mechanism of the apparatus described above, the piston 4 may be in any position in the cylinder 1 corresponding to the fore and aft position of the pilot at any moment with respect to his seat, when the pilot's forward movement will automatically be prevented if, due to a sudden deceleration of the aircraft, his forward relative velocity becomes greater than the predetermined maximum value, this arresting of the pilot's movement being a result of the closing of the valve 37 and the prevention of the forward movement of the main piston 4 by the relatively incompressible volume of liquid lying between the head of the valve 37 and the front end or pressure side of the piston 4.

By appropriate design of the check valve 37 and choice of the rate of the control spring 55, it may be arranged that the check valve 37 will not close instantaneously but will close gradually, though sufficiently rapidly, thus reducing the stress on the pilot whilst checking his forward movement relative to the aircraft.

The use of the spring 43 reduces the distance that the valve 37 must be moved to close it since the valve follows the push rod 41 and its stem is maintained in contact with the latter. Consequently, a rapid build up of hydraulic pressure on the valve 37 is ensured even when there are acceleration forces acting to maintain the valve open, such as for example those which result from the inertia of the valve and the parts connected therewith. The said spring also prevents the valve re-opening under the influence of the said acceleration forces when the inertia forces on the pilot are temporarily relaxed.

The control shaft 70 is operated by manually actuated remote control means incorporating a hand lever 77 adapted to be arranged in a position accessible to the pilot and transmitting rotational movement to the shaft 70 in one direction through the medium of a flexible cable, such as for example the cable known as the Bowden cable. Such a control is illustrated in the drawings and will be particularly described below, but it should be understood that any other suitable remote control providing for the rotation of the control shaft 70 and the setting of the same in the various positions already referred to may be employed, such remote control means being mechanical, hydraulic, pneumatic, or electrical, or a combination of these means.

In the embodiment of the invention shown in the drawings, the control and transmission mechanism comprises a drum 78 fixed coaxially on an outward extension of the control shaft 70 beyond the cover cap 73. The drum 78 being enclosed by a cylindrical casing 79 secured at one end upon a boss 80 on the cover 73, the casing 79 being provided with a detachable closure plate 81 at its outer side.

The drum 78 is provided with a peripheral groove 82 and with a peripheral notch 83, the groove 82 serving to receive the inner cable of a flexible remote control assembly 84, the end of the cable having a nipple 85 anchored in the notch 83 in the drum. The outer cover of the cable assembly 84 is seated in the conventional manner in an adjustable cup 86 adjustably screwed into a boss 87 on the drum housing 79.

The cable winds around the drum 78 in an anti-clockwise direction and is adapted to turn the drum in a clockwise direction when the tension in the cable is increased, whilst the drum is returned in the opposite, i. e. anti-clockwise direction, by means of a spiral spring 88 anchored at 89 to the drum and at 90 to the drum housing 79.

The spring 88 thus operates resiliently to urge the drum 78 and the control shaft 70 to the "Manually Locked" position, i. e. the position in which the control piston 62 is fully withdrawn rearwardly (the position shown in Figure 3). The drum 78 is prevented from rotating under the influence of the said spring beyond the "Manually Locked" position by stop means comprising a pin 93 rigidly fixed in the housing 79 which projects into an annular groove 92 in one face of the drum 78 and concentric with the control shaft 70, the groove 92 being furnished at its base with a pin 91 so located that the pins 91 and 93 abut one another when the drum 78 has been rotated to the "Manually Locked" position (shown in Figure 3) by the spiral spring 88. Thus should the inner cable of the flexible cable assembly 84 break, the apparatus is automatically set in the "Manually Locked" position and the pilot will be locked against forward movement relatively to his seat and held in safety.

The arrangement is such that reducing the effective length of the inner cable of the cable assembly with respect to the cover of the latter will result in the drum 78 being rotated in a clockwise direction (as seen in Figure 4) against the tension of the spring 88, this rotation of the drum effecting the movement, through the eccentric 69 and the associated parts, of the control piston 62 forwardly, first setting the parts of the mechanism in the "Auto Lock" position previously described, and then, on further rotation of the drum 78 in the clockwise direction, setting the said parts in the "Forced Unlocked" position.

The operation of the inner cable of the cable assembly 84 is effected through a second drum 94 (Figures 4 and 6) mounted within a cylindrical casing 95 adapted for mounting in any suitable position, e. g. upon the side of the fuselage of the aircraft and adjacent the pilot, said drum 94 being rotatable about a central spindle 96 coaxially supported in the casing 95. The drum 94 is furnished with a peripheral groove 97 in which is located the end portion of the said inner cable of the said cable assembly remote from that attached to the drum 78, this end portion of the inner cable being anchored to the drum 94 by means of a nipple 98 engaging in a notch 99 in the drum 94 and the inner cable extending around the said drum in a clockwise direction as the drum is seen in Figure 4.

The housing 95 is furnished with a boss 100 receiving an adjusting screw 101 in which seats the adjacent end of the outer cover of the said flexible cable assembly. A spiral spring 102, housed within the said casing 95 and anchored at one end (103) to the casing and at the other end (104) to the drum, serves to assist in returning the inner cable of the flexible cable assembly from the drum 94 to the drum 78, thus assisting the spring 88 of the drum 78 and helping to overcome frictional resistance in the mechanism.

In the front surface of the drum 94 is formed a diametrical groove or recess 105 in which is located the strip-like shank 106 of the control lever 77 previously referred to, this lever projecting radially from the drum 94 through a slot 107 in the peripheral wall of the drum casing 95 and being furnished at its outer end with a knob 108 or the like. The shank 106 of the lever 77 is at its inner end anchored by means of screw 109 to the drum 94 in such a way that the outer portion of the lever 77 may be urged or flexed away from the face of the drum 94 by means of a spring 110 housed within a recess 111 in the drum 94 at the opposite part of the periphery of the drum 94 to the screw 109. The spindle 96 passes through a hole 112 in the shank 106 of the lever 77 said hole being large enough to give ample clearance to allow the lever to flex outwards from the drum. The slot 107 in the casing 95 is (as shown in Figure 5), shaped to provide, in conjunction with a projection 113 on the inside surface of the front cover 114 of the housing 95, a control gate for the lever 77, this gate providing a middle position 115 corresponding to the "Auto Lock" position of the lever and two end positions 116 and 117 which respectively provide the "Forced Unlocked" and "Manually Locked" settings for the control lever.

It will be appreciated that the gate does not provide any means for retaining the lever 77 in the "Forced Unlocked" position, the lever being returned automatically to the "Auto Lock" position by the effect of the springs 88 and 102 of the remote control mechanism. On the other hand the lever 77 is retained in the "Auto Lock" position when placed therein by reason of the engagement of the leading edge of the lever 77 with the trailing edge of the projection 113 of the cover plate 114 against which projection the lever is urged by the tension of the spring 102. Similarly the control lever 77 is held in the "Manually Locked" position by being held by the spring 102 against the end of the gate slot 107.

The spring 110 which, as described above urges the lever away from the face of the drum, ensures that the lever remains in the "Auto Lock" position in the gate when set therein, it being necessary to move the lever against the action of the spring 110 before the lever can move under the influence of the spring 102 to the "Manually Locked" position.

In the modification of the invention illustrated in Figure 7 the construction is in the main the same as that shown in Figures 1 to 6, the difference being merely that the tubular piston rod 5 is replaced by a solid piston rod 5' and the internal overlapping springs 27 and 28 are replaced by an internal spring 27' acting on the compensating piston 24' and located within the rear part of the cylinder 1', the compensating piston 24 being slidable on the piston rod 5' instead of within the piston rod.

In the further modification shown in Figures 8 and 9, instead of employing a liquid transferring means in the form of a piston and cylinder, i. e. in the form of a reciprocating pump, liquid transferring means are employed which comprise a rotary vane type of pump, the latter being filled with the hydraulic liquid which flows through a by-pass and is controlled in the same way as has previously been described with relation to the other embodiments of this invention.

Referring to Figures 8 and 9 it will be seen that the valve chamber 21' communicates on opposite sides of the ported partition 33' and valve 37' by means of by-passes 22' and 23' with the interior of a rotary pump casing 119 within which is rotatably and eccentrically mounted a rotary pumping element in the form of a rotor 120 furnished with a plurality of radially slidable vanes 121 urged outwardly by springs 122 and operating in the usual manner of a rotary vane pump. The rotor 120 is fixed upon a shaft 123 which carries a drum 124 around which is wound a flexible cable 125 fixed at one end to the periphery of the drum and, at the other end, attached to the safety harness of the pilot, so that as the pilot moves forwardly relatively to his seat 3, the drum 124 is caused to rotate in a direction such as to pump liquid through the predetermined flow path comprising the by-pass 22', the chamber 21' and the by-pass 23' in the direction of the arrows A', Figure 8, the check valve 37' being adapted to close under the influence of the hydraulic pressure acting on the head of the valve 37' should the relative velocity of the pilot exceed a predetermined value for which the apparatus is set. A spiral return spring 126 is anchored at one end to the case 119 of the pump and, at the other end, to the drum 124 so as to assist the pilot in returning to his normal position in his seat and to rewind the cable about the drum 124 and to return the rotor of the pump to its normal or initial position.

The control of the valve 37' is effected in the same way as has been described with reference to Figures 1 to 6 of the accompanying drawings.

In the still further modified embodiment of the invention shown in Figures 10 and 11 the method of operation is the same as that described with reference to Figures 1 to 6 and 7 of the drawings but the check valve in this case is located in the piston of the apparatus which is stationary in this instance with respect to the aircraft, whilst the cylinder in which the piston is located moves with the pilot.

Referring to Figure 10, it will be seen that the cylinder 1", which is closed at both ends, is slidably mounted in a guide sleeve 127 suitably fixed to the aircraft fuselage 2, the rear end of the cylinder 1" carrying the axle 9" and sprocket 10" over which passes a chain 11' corresponding to the chain 11 previously described, the chain 11' being anchored at one end to a lug 128 on the guide sleeve 127 and at the other end attached to a coupling rod 13' for attachment to the safety harness of the pilot. The piston rod 5" is fixed coaxially in the said guide sleeve 127 and is of tubular form and the piston 4" is fixed upon the rear end of this piston rod and is furnished with a plurality of longitudinal passages 129 extending therethrough and meeting in a cylindrical part at the rear end of the piston. The latter is provided with an annular valve seat upon which the check valve 37" is adapted to seat to check the flow of liquid from one side of the piston to the other. In this embodiment of the invention the by-passing of liquid thus takes place through the piston entirely within the closed cylinder 1". A compensating piston 24" is slidably mounted on the tubular piston rod 5" and is located between the front end of the cylinder 1" and the piston 4".

The check valve 37" is carried at the rear end of a rod which in effect forms an extended stem 38" of the valve, this stem being adapted to co-operate with control mechanism substantially as hereinbefore described, or similar thereto. Referring to Figure 11, it will be seen that the control mechanism shown is somewhat similar to that previously described. The stem 38" of the valve 37" is urged forwardly by a light rate spring 43" operating upon a collar 44" on the stem and the stem itself bears, at its forward extremity, upon an adjustable screw 130, located in the forward end of an axial bore through a push rod 41" and into the rear end of which the stem 38" slidably projects. The push rod 41" carries a pair of flanged nuts 57" and 58", by which a control piston 62", axially slidable in a guide sleeve 40", is connected to the push rod 41". The control piston 62" is connected to an eccentric strap 68" operated by an eccentric 69" from a control shaft 70" as previously described with reference to the other embodiments of the invention.

The rear portion of the push rod 41" is furnished with an externally frusto-conical head 48" on which is axially slidably mounted a plunger collar 49" in radial bores of which are mounted a series of locking balls 51". The latter are adapted to be urged outwardly by radial pins 131 mounted in the plunger collar 49" having their inner ends bearing upon the frusto-conical surface of the head 48" of the push rod 41", and having their outer ends 132 chamfered in the opposite direction to the taper of the frusto-conical surface of the head of the push rod 41". Thus when the collar 49" moves towards the rear end of the push rod 41" the pins 131 are forced outwardly in the collar 49" and the latter is locked by means of the balls 51" against rearward movement under the action of a control spring 55" acting thereon. Thus normally the control spring 55" maintains the check valve 37" open but when the rate of flow of liquid past the valve exceeds a predetermined value, pressure is built up on the rear side of the valve which causes the latter partially or wholly to close against the influence of the spring 55". When the valve closes the transfer of liquid from one side of the piston to the other is arrested and the pilot is locked in whatever position he has reached at this stage.

The mechanism gives the various possible settings previously referred to as the "Forced Unlocked", "Auto Lock" and "Manually Locked" positions. It will be seen that when the valve is closed the push rod 41" is pushed forwardly carrying the collar 49" with it and that when pressure is released on the valve 37" the collar 49" cannot move rearwardly again under the action of the spring 55" until the push rod 41" has been moved forwardly by the control piston 62" on operation of the control spindle 70". By setting the latter in the position shown in Figure 11 the apparatus is retained in the manually locked position, the valve being kept closed by the spring 43". To set the apparatus in the "Auto Lock" position, the spindle 70" is rotated to move the push rod 41" rearwardly to release the collar 49" which moves forward under the influence of spring 55" until the latter engages the annular stop 56".

It will, of course, be understood that the mechanism is charged with liquid, e. g. oil, in the essential parts and these parts are sealed against leakage of the oil as described. Moreover, it will be understood that the main piston 4 or 4" may be furnished with sealing rings if desired, as may any other moving parts of the apparatus operating in the cylinder or like part.

The pressure at which the check valve is adapted to close could be modified in the case of the embodiment of the invention shown in Figures 1 to 6 for example, by replacing the control spring 55 by one of a different rate whilst in the embodiment of the invention shown in Figures 10 and 11 the same effect could be obtained by adjustment of the screw 130.

We claim:

1. Hydraulic apparatus for controlling the relative velocity in a predetermined direction between two bodies which normally move together in unison, such apparatus comprising liquid transferring means adapted to be attached to one of said bodies; coupling means for connecting the said liquid transferring means to the other of said bodies to cause the operation of said liquid transferring means as a result of relative movement occurring in the said predetermined direction between said bodies; a conduit connected to said liquid transferring means and constituting a flow-path through which liquid is forced upon operation of said liquid transferring means; a check valve located in said conduit; control spring means co-operating with said check valve normally to maintain the latter open, thereby to permit liquid to flow through said conduit in either direction; said check valve at least partially closing against the action of said control spring means in response to the pressure of liquid forced through said conduit by the said liquid transferring means to check the said flow of the liquid when such flow exceeds a predetermined velocity, thereby to check the relative movement in said predetermined direction between the said bodies; and catch means co-operating with said control spring means to prevent the continued co-operation of said control spring means with said check valve subsequent to a liquid-flow-checking operation of the latter.

2. Hydraulic apparatus for controlling the relative velocity in a predetermined direction between two bodies which normally move together in unison, such apparatus comprising liquid pumping means adapted to be attached to one of said bodies, and including a pumping element; coupling means for connecting the said pumping element to the other of the said bodies to cause the operation of the said pumping means as a result of relative movement occurring in said predetermined direction between said bodies; a conduit connecting the output and input sides of the said pumping means and constituting a flow path through which liquid is forced upon the operation of the said pumping means; a check valve located in said conduit; control spring means co-operating with said check valve normally to maintain the latter open thereby to permit liquid to flow through said conduit in either direction; said check valve at least partially closing against the action of said control spring means in response to the pressure of liquid forced through said conduit by the said liquid pumping means to check the said flow of the liquid when the said flow exceeds a predetermined velocity in one direction and thereby to check the relative movement in the said predetermined direction between the said bodies; and catch means co-operating with said control spring means to prevent the continued co-operation of the said control spring means with said check valve subsequent to a liquid-flow-checking operation of the latter.

3. Hydraulic apparatus according to claim 2 having catch-releasing means co-operating with said catch means for manually releasing said control spring means from the influence of said catch means.

4. Hydraulic apparatus according to claim 3 wherein the said catch-releasing means are adjustable to prevent, when so desired, said check valve from closing, irrespective of the pressure of liquid acting thereon.

5. Hydraulic apparatus according to claim 4 having spring means co-operating with said check valve for at least partially closing the latter when said catch means prevent co-operation of said control spring means with the check valve.

6. A control unit for use with hydraulic apparatus for controlling the relative velocity in a predetermined direction between two bodies which normally move together in unison, such control unit comprising a chamber adapted to be incorporated in a conduit through which the said hydraulic apparatus forces liquid when relative movement in the said predetermined direction occurs between the bodies; a check valve in said chamber; a push rod co-operating with said check valve; a collar axially slidable relative to said push rod; a control spring acting against said collar to urge the latter axially along said push rod; co-operating means on said collar and said push rod transmitting the influence of said control spring to the push rod and thence to said check valve to maintain the latter open, but said check valve at least partially closing against the action of said control spring in response to the pressure of liquid forced through said chamber by the operation of said hydraulic apparatus when the flow of liquid through the said chamber exceeds a predetermined velocity, thereby to check such liquid flow; catch means co-operating with said collar to retain the latter against the influence of said control spring subsequent to a liquid-flow-checking operation of said check valve; and control mechanism connected to said push rod for withdrawing, when desired, the push rod and collar until said catch means operate to retain the latter against the action of said control spring, for releasing said catch means, and, when desired, for urging said push rod in a check valve-opening direction thereby to hold said check valve open irrespective of the pressure of liquid acting thereon.

7 A control unit according to claim 6, including a guide sleeve for said collar and within which the latter is reciprocable, said catch means comprising a plurality of locking elements carried by said collar and co-operating with said guide sleeve to lock said collar thereto when said push rod and collar have withdrawn in the check valve-closing direction.

8. A control unit according to claim 7, including corresponding tapered co-operating surfaces on said push rod and on said collar which abut when said push rod and collar are withdrawn in the check valve-closing direction, said locking elements comprising balls in radial bores in said collar, said balls being driven outwardly of said collar to engage said guide sleeve upon abutment of said tapered surfaces on the push rod and collar.

9. Hydraulic apparatus for controlling the relative velocity in a predetermined direction between two bodies which normally move together in unison, such apparatus comprising liquid pumping means adapted to be attached to one of said bodies and including a pumping element; coupling means for connecting the said pumping element to the other of the said bodies to cause the operation of the said pumping means as a result of relative movement occurring in said predetermined direction between said bodies; a conduit connecting the output and input of said pumping means and constituting a flow path through which liquid is forced upon operation of the said pumping means; a chamber in said conduit; a check valve in said chamber; a push rod co-operating with said check valve; a collar axially slidable relative to said push rod; a control spring acting against said collar to urge the latter axially along said push rod; co-operating means on said collar and said push rod transmitting the influence of said control spring to the push rod and thence to said check valve to maintain the latter open, but said check valve at least partially closing against the action of said control spring in response to the pressure of liquid forced through said chamber by the operation of said pumping element when the flow of liquid through said chamber exceeds a predetermined velocity, thereby to check such liquid flow and consequently the relative movement in the said predetermined direction between the said bodies; catch means co-operating with said collar to retain the latter against the influence of said control spring subsequent to a liquid-flow-checking operation of said check valve; and control mechanism connected to said push rod for withdrawing, when desired, the push rod and collar until said catch means operate to retain the latter against the action of said control spring, for releasing said catch means, and, when desired, for urging said push rod in a check valve-opening direction thereby to hold said check valve open irrespective of the pressure of liquid acting thereon.

10. Hydraulic apparatus according to claim 9, including a guide sleeve for said collar and within which the latter is reciprocable, said catch means comprising a plurality of locking elements carried by said collar and co-operating with said guide sleeve to lock said collar thereto when said push rod and collar have withdrawn in the check valve-closing direction.

11. Hydraulic apparatus according to claim 10, including corresponding tapered co-operating surfaces on said push rod and on said collar which abut when said push rod and collar are withdrawn in the check valve-closing direction, said locking elements comprising balls in radial bores in said collar, said balls being driven outwardly of said collar to engage said guide sleeve upon abutment of said tapered surfaces on the push rod and collar.

12. Hydraulic apparatus according to claim 9, wherein said control mechanism includes a control piston movable coaxially with respect to said push rod; a lost-motion linkage connecting said control piston to the push rod but permitting the latter to move axially through a predetermined distance independently of the control piston; and means for adjusting said control piston axially with respect to the said chamber to effect withdrawal of the push rod and collar until said catch means operate to retain the latter against the action of said control spring thereby to free the said check valve from the influence of said control spring (the "Manually locked" setting); movement of the push rod towards said check valve to release said catch means and thereby to restore the influence of said control spring upon said check valve (the "Auto lock" setting); and to hold said push rod positioned to maintain the said check valve open irrespective of the pressure of liquid acting thereon (the "Forced unlocked" setting).

13. Hydraulic apparatus according to claim 12, wherein said means for adjusting the said control piston with respect to said chamber comprise a control shaft; means for rotating said control shaft through predetermined angular distances; an eccentric on said control shaft; and linkage means connecting said eccentric to said control piston for converting rotational movement of said control shaft into axial movement of said control piston.

14. Hydraulic apparatus according to claim 13, in which said means for rotating said control shaft comprise a drum carried coaxially by said control shaft; a flexible cable wrapped at one end around said drum and adapted to rotate the latter in one direction when tension is applied to said flexible cable; spring means co-operating with said drum and tending to rotate the latter in the other direction; stop means for preventing rotation of said drum beyond a predetermined position under the influence of said spring means; a further drum mounted for rotation about its own axis and about which the second end of said flexible cable is wrapped; further spring means co-operating with said further drum and tending to rotate the latter in a cable-unwinding direction; a lever carried by said further drum; gate means for retaining said lever in either of two positions, in the first of which said control piston, by virtue of the rotational positions of said drums, occupies a position corresponding to said "Manually locked" setting, and in the second of which said control piston occupies a position corresponding to said "Auto lock" setting; and said gate means permitting said lever to be moved to a third position (when said control piston occupies a position corresponding to said "Forced unlocked" setting) but from which the lever will automatically be returned to said second position upon its subsequent release by the operator.

15. Hydraulic apparatus according to claim 2, wherein said liquid pumping means comprise a cylinder sealed at both ends and adapted to be attached to one of said bodies, and said pumping element comprises a piston reciprocable in said cylinder and so connected to the other of said bodies by said coupling means that the piston is moved axially within the cylinder in one direction upon relative movement occurring between said bodies in said predetermined direction; and spring means acting between said piston and said cylinder for urging said piston in the opposite direction.

16. Hydraulic apparatus according to claim 15, wherein said pumping element includes a piston rod fixed to said piston and disposed coaxially with said cylinder; and compensating means for increasing the effective volume of the cylinder on the side of the said piston adjacent to said piston rod.

17. Hydraulic apparatus according to claim 16, wherein said control spring means comprise a push rod adapted to co-operate with the said check valve, a collar axially slidable relative to said push rod, and a control spring acting against said collar to urge the latter axially along said push rod; co-operating means on said collar and push rod transmitting the influence of said control spring to said push rod and thence to said check valve to maintain the latter open whilst the liquid pressure is insufficient to cause the said at least partial closing of the check valve; said catch means being carried by said collar to retain the latter against the influence of said control spring subsequent to a liquid-flow-checking operation of said check valve; and control mechanism connected to said push rod for withdrawing, when desired, the push rod and collar until said catch means operate to retain the latter against the action of said control spring, for releasing said catch means, and, when desired, for urging said push rod in a check valve-opening direction thereby to hold said check valve open irrespective of the pressure of liquid acting thereon.

18. Hydraulic apparatus according to claim 17, wherein the said control mechanism includes a control piston movable coaxially with respect to said push rod; a lost-motion linkage connecting said control piston to the push rod but permitting the latter to move axially through a predetermined distance independently of the control piston; and means for adjusting said control piston axially with respect to the said chamber to effect withdrawal of the push rod and collar until said catch means operate to retain the latter against the action of said control spring thereby to free the said check valve from the influence of said control spring (the "Manually locked" setting); to effect movement of the push rod towards the said check valve to release said catch means and thereby to restore the influence of said control spring upon said check valve (the "Auto lock" setting); and to hold said push rod positioned to maintain the said check valve open irrespective of the pressure of liquid acting thereon (the "Forced unlocked" setting).

19. Hydraulic apparatus according to claim 18, wherein the said means for adjusting the said control piston with respect to said chamber comprise a control shaft; means for rotating said control shaft through predetermined angular distances; an eccentric on said control shaft; and linkage means connecting said eccentric to said control piston for converting rotational movement of said control shaft into axial movement of said control piston.

20. Hydraulic apparatus according to claim 19, in which said means for rotating said control shaft comprise a drum carried coaxially by said control shaft; a flexible cable wrapped at one end around said drum and adapted to rotate the latter in one direction when tension is applied to said flexible cable; spring means co-operating with said drum and tending to rotate the latter in the other direction; stop means for preventing rotation of said drum beyond a predetermined position under the influence of said spring means; a further drum mounted for rotation about its own axis and about which the second end of said flexible cable is wrapped; further spring means co-operating with said further drum and tending to rotate the latter in a cable-unwinding direction; a lever carried by said further drum; gate means for retaining said lever in either of two positions, in the first of which said control piston, by virtue of the rotational positions of said drums, occupies a position corresponding to said "Manually Locked" setting, and in the second of which said control piston occupies a position corresponding to said "Auto Lock" setting; and said gate means permitting said lever to be moved to a third position (when said control piston occupies a position corresponding to said "Forced Unlocked" setting) but from which the lever will automatically be returned to said second position upon its subsequent release by the operator.

21. Hydraulic apparatus according to claim 2, wherein said liquid pumping means comprise a rotary vane type pump adapted to be attached to one of the said bodies and said pumping element comprises the rotor of such pump so connected to the other of said bodies by said coupling means that upon relative movement occurring between the said bodies in the said predetermined direction and sense, said rotor is caused to rotate in one direction; and spring means co-operating with said rotor and tending to rotate the latter in the other direction.

22. Hydraulic apparatus according to claim 21, wherein said control spring means comprise a push rod adapted to co-operate with the said check valve; a collar axially slidable relative to said push rod, and a control spring acting against said collar to urge the latter axially along said push rod; co-operating means on said collar and push rod transmitting the inflence of said control spring to said push rod and thence to said check valve to maintain the latter open whilst the liquid pressure is insufficient to cause the said at least partial closing of the check valve; said catch means being carried by said collar to retain the latter against the influence of said control spring susbequent to a liquid-flow-checking operation of said check valve; and control mechanism connected to said push rod for withdrawing, when desired, the push rod and collar until said catch means operate to retain the latter against the action of said control spring, for releasing said catch means, and, when desired, for urging said push rod in a check valve-opening direction thereby to hold said check valve open irrespective of the pressure of liquid acting thereon.

23. Hydraulic apparatus according to claim 22, said control mechanism including a control piston movable coaxially with respect to said push rod; a lost-motion linkage connecting said control piston to the push rod but permitting the latter to move axially through a predetermined distance independently of the control piston; and means for adjusting said control piston axially with respect to the said chamber to effect withdrawal of the push rod and collar until said catch means operate to retain the latter against the action of said control spring thereby to free the said check valve from the influence of said control spring (the "Manually locked" setting); to effect movement of the push rod towards said check valve to release said catch means and thereby to restore the influence of said control spring upon said check valve (the "Auto Lock" setting); and to hold said push rod in such a position that the said check valve is maintained open irrespective of the pressure of liquid acting thereon (the "Forced unlocked" setting).

JOHN LOVE.
WILLIAM M. SUTHERLAND.

REFERENCES CITED

The following references are of record in the file of this patent:

UNITED STATES PATENTS

| Number | Name | Date |
|---|---|---|
| 2,033,035 | Koons | Mar. 3, 1936 |
| 2,093,015 | Madden | Sept. 14, 1937 |
| 2,405,062 | Sheldon | July 30, 1946 |
| 2,411,392 | Saville | Nov. 19, 1946 |
| 2,424,198 | Tauscher | July 15, 1947 |
| 2,515,516 | Kalen et al. | July 18, 1950 |

FOREIGN PATENTS

| Number | Country | Date |
|---|---|---|
| 570,015 | Great Britain | June 19, 1945 |